H. Jenkins.

Iron Fence.

No. 807. Reissued Sept. 6, 1859.

Fig. 3,

Witnesses
Samuel W. Shull
Thos. Geo. Harold

Inventor.
Henry Jenkins

UNITED STATES PATENT OFFICE.

HENRY JENKINS, OF BROOKLYN, NEW YORK.

IMPROVED ORNAMENTAL CONNECTION OF THE PARTS OF AN IRON FENCE.

Specification forming part of Letters Patent No. 8,654, dated January 13, 1852; Reissue No. 807, dated September 6, 18 9.

*To all whom it may concern:*

Be it known that I, HENRY JENKINS, of Brooklyn, in the county of Kings and State of New York, (formerly of Cincinnati, Ohio,) did invent a new and useful mode of constructing or forming cast-iron work on iron fences or other articles; and the following is hereby declared to be a full, clear, and exact description of the nature of my said invention and the characters which distinguish it from all things before known, and of my manner of making, modifying, and using my said improvement, reference being had to the accompanying drawings, making a part of this specification, wherein—

Figure 1:
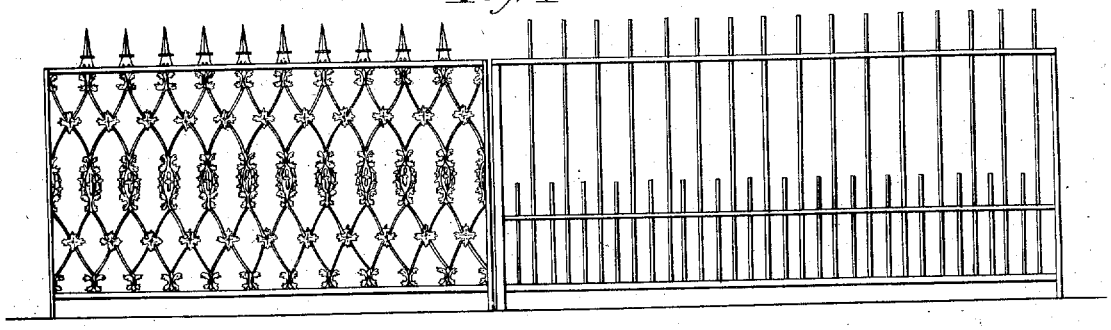
Figure 2:
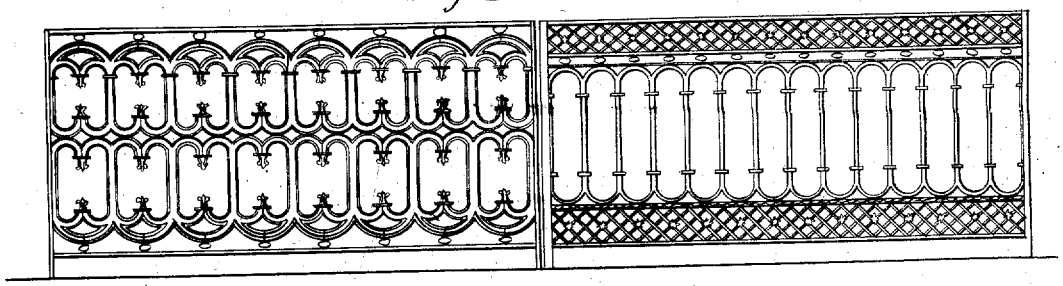
Figure 2:
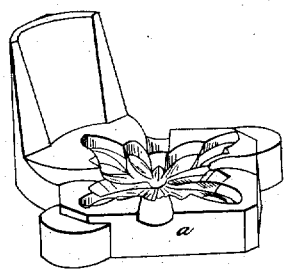
Figure 2:
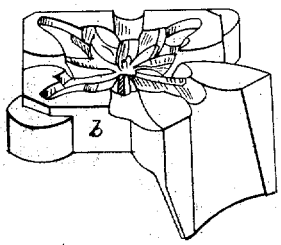

Figure 1 shows my improvement in fences as contrasted with the ordinary fence. Fig. 2 shows two panels of fence of different forms, to which my invention is applied; and Fig. 3 shows the molds of iron in which my cast-iron ornaments are formed.

My improvement consists in the mode of constructing or forming cast-iron work to connect wire, rods, or other parts of metallic fences, railings, or other articles wherever available.

The fence or railing is constructed in any known or convenient form, that made of wrought-iron bars similar to those shown in my patent of March 6, 1847, however, is preferred. The fence or other article may be of any desirable pattern and the ornaments especially adapted to the purpose are cast upon it. When the wrought-iron pieces come together or intersect each other, (after the wrought-iron parts are set up,) they are connected together by the ornamental casting. This is done by having molds of iron to fit the wrought-iron work, or work or wire, and formed with the cavity to make the ornament, which molds are divided in such a manner that they can be shut upon said iron work, and so as to permit an iron ornament or connection to be cast directly in such molds on the fence, thus ornamenting or permanently fastening the parts together, making a cheap, durable, and highly-ornamental structure at a much less cost per foot than a plain wrought-iron fence of ordinary construction.

It will be understood that the parts of wrought-iron are put together, the iron molds *a b*, (see Fig. 3,) or molds of any other form to suit the position or character of ornament or connection, are put together, and the melted iron poured in, which immediately cools or consolidates so that the molds can be removed.

To form a picket one or more of the wires are left projecting above the top rail, and the picket is cast upon them, which fastens the parts perfectly. At the same time the iron running into the joints and connecting the whole together makes the joint water-tight and permanent. A shoulder is also formed in the same way on the under side of the top rail on the wire.

A metallic mold in itself is not claimed, nor a fence, railing, or other article formed of wrought and cast iron work; neither are castings formed onto metallic rods embedded in sand claimed; but such sand molds cannot be applied with facility to ornament the various intersecting parts of wrought-iron work, whereas the movable divided iron molds can be instantaneously applied to any part of the iron work, and the iron casting cools so quickly that the mold can be removed and applied for the next casting, and the ornaments are left clean and sharp, only requiring that the gates or overflow metal should be broken off and the casting slightly trimmed.

What I claim as my invention, and desire to secure by Letters Patent, is—

Forming the ornament or cast-iron connections for a railing, fence, or other article of iron cast into a divided iron mold, substantially as and for the purposes specified.

In witness whereof I have hereunto set my signature this 20th day of August, 1859.

HENRY JENKINS.

Witnesses:

LEMUEL W. SERRELL,

THOS. GEO. HAROLD.